July 15, 1952  C. C. HAAS  2,603,172
IMPLEMENT LIFT AND UNGEAR SYSTEM
Original Filed Oct. 25, 1946  3 Sheets-Sheet 3
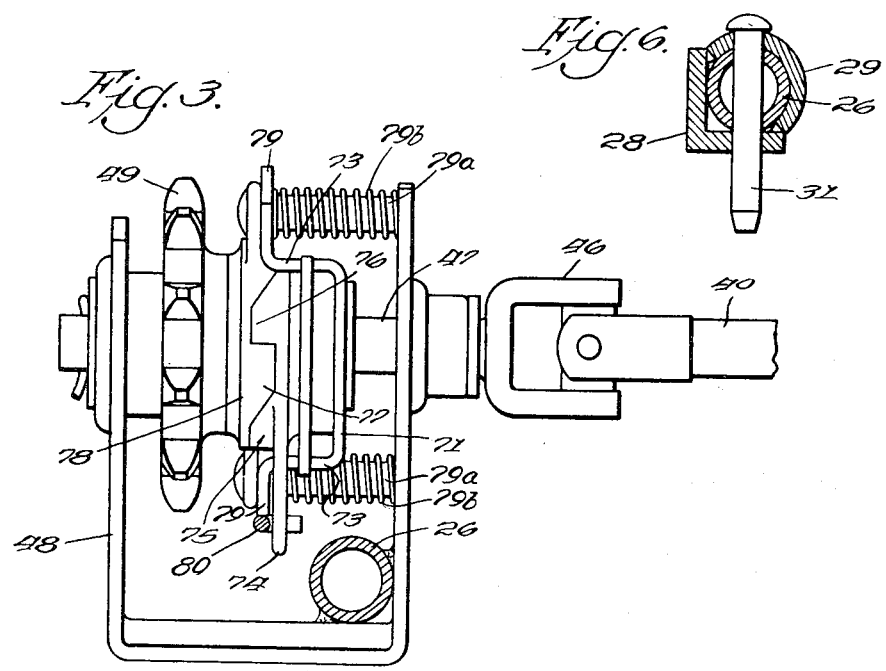
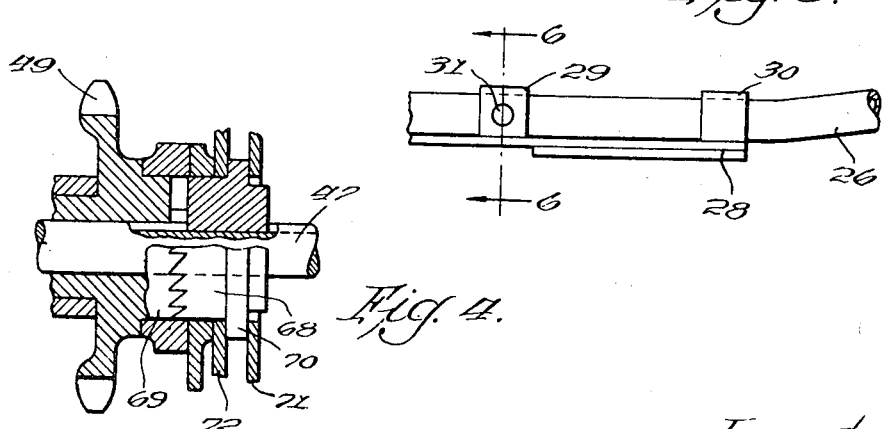
Inventor:
Clarence C. Haas.
Paul O. Pippel
Atty Patented July 15, 1952

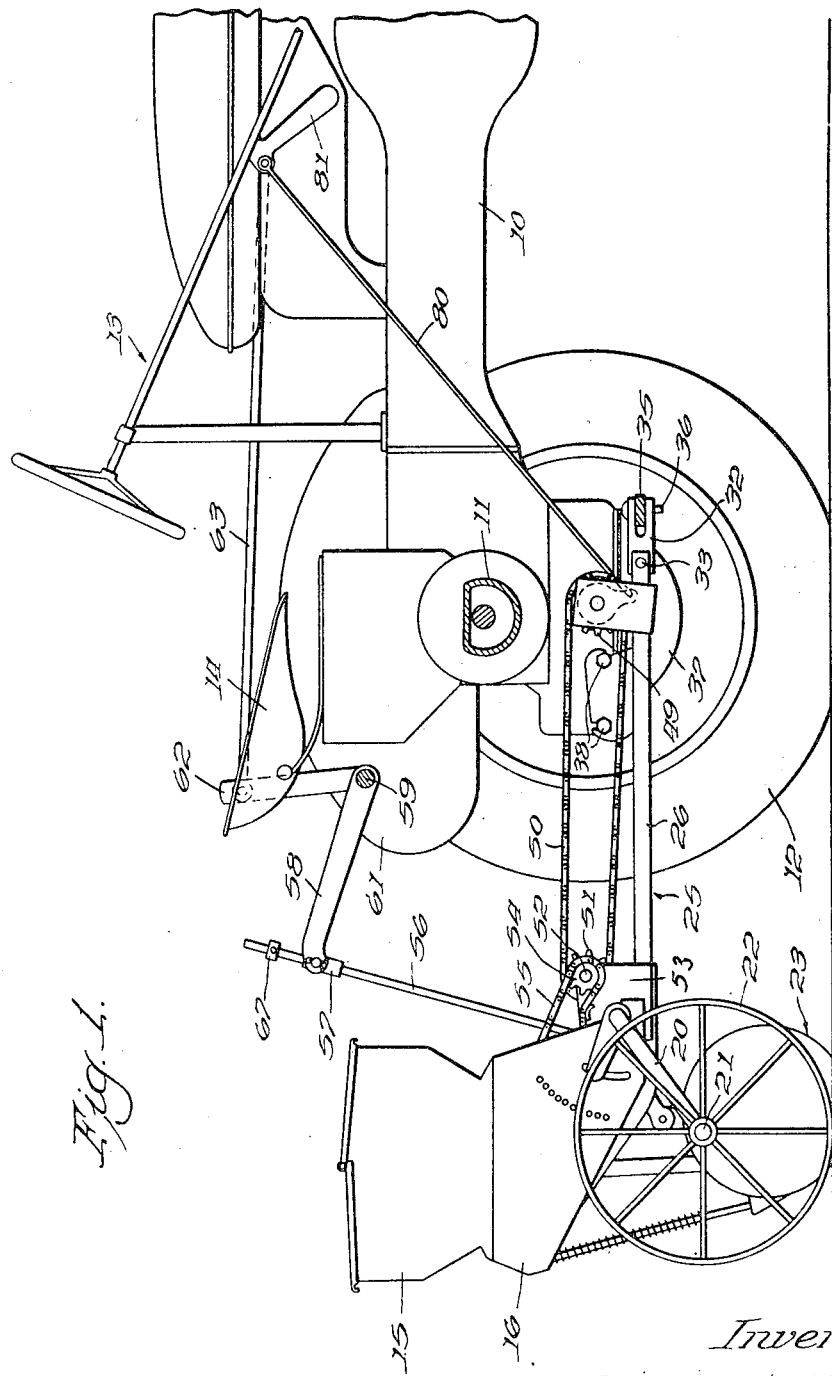

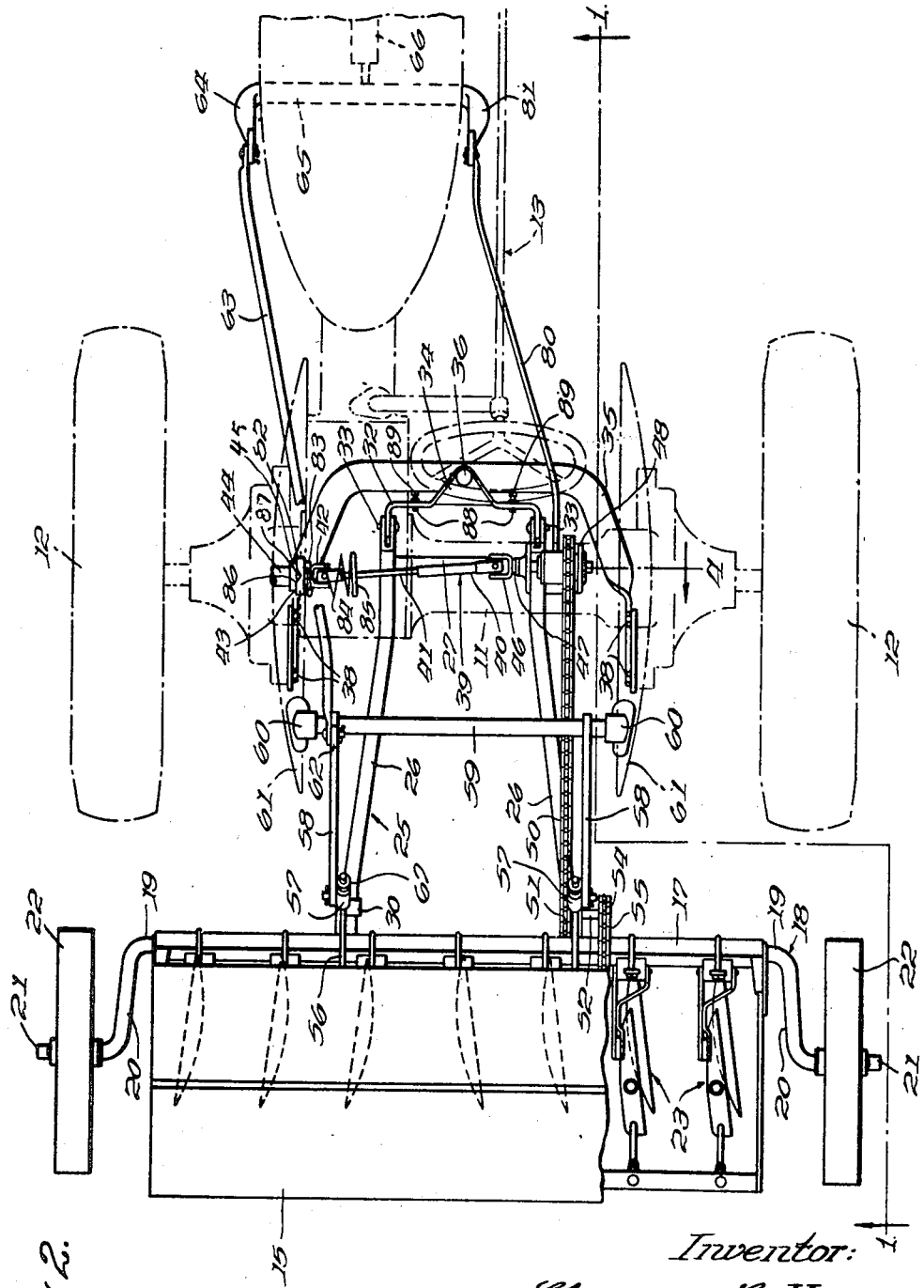

2,603,172

UNITED STATES PATENT OFFICE 2,603,172

IMPLEMENT LIFT AND UNGEAR SYSTEM

Clarence C. Haas, Richmond, Ind., assignor to International Harvester Company, a corporation of New Jersey Original application October 25, 1946, Serial No. 705,709. Divided and this application August 5, 1950, Serial No. 177,920

2 Claims. (Cl. 111—67)

This application is a division of United States application Serial No. 705,709, filed October 25, 1946.

An object of the invention is to provide an improved grain drill or the like, adapted to be pivotally connected to a tractor having a power lift, with means including a clutch for transmitting power from the tractor to drive dispensing mechanism of the drill and connections between the power lift and the drill and clutch, respectively, for disconnecting the clutch when the drill is lifted for transport.

Other objects and advantages will become clear from the following detailed description when read in conjunction with the accompanying drawings, wherein:

Figure 1 is a view in side elevation of the rear portion of a tractor with one wheel removed, showing a grain drill embodying the features of the present invention attached thereto and is a partial section taken on the line 1—1 of Figure 2;

Figure 2 is a plan view of the structure shown in Figure 1, the tractor being indicated in dotted lines to illustrate the attachment of the implement thereto;

Figure 3 is an enlarged detail of the drive transmission mechanism and throw-out mounted on the implement hitch structure;

Figure 4 is a section taken on the line 4—4 of Figure 2.

Figure 5 is a detail showing the connection of the hitch structure to the implement frame; and Figure 6 is a section on the line 6—6 of Figure 5.

Referring to the drawings, the hitch and planter drive structure of the present invention is illustrated in its application to a grain drill such as is shown and described in copending application Serial No. 705,630, filed October 25, 1946. The drill is mounted upon a tractor having a longitudinally extending laterally offset body 10, a rear axle structure 11 and laterally spaced rear drive wheels 12. The tractor is likewise provided with conventional steering mechanism 13 and an operator's station 14.

The grain drill is adapted to be directly connected to the tractor to be transported thereupon and comprises a transversely extending grain box 15 having at each end thereof a depending plate or frame piece 16. The plate 16 is generally triangular in shape and is secured at its forward lower end to a transversely extending hollow frame bar 17. The open ends of transverse frame bar 17 provide a bearing for the mounting of a crank axle 18 having a transverse portion 19 rotatably received in the bar, a downwardly and rearwardly extending portion 20, and a laterally extending portion 21 upon which is mounted a wheel 22.

The grain drill is provided with seed depositing mechanism generally indicated at 23 and is carried upon supporting wheels 22.

The hitch structure by which the grain drill is attached in draft receiving relation to the tractor comprises a U-shaped member generally indicated at 25 and comprising laterally spaced longitudinally extending tubular members 26. The members 26 converge forwardly and are braced near their forward ends by a cross-piece 27. The rear ends of the members 26 are each received in a socket member shown in Figure 5 and comprising a base portion 28 affixed to the transverse frame bar 17. Each of the members 26 has secured thereto at longitudinally spaced locations sleeve or socket members 29 and 30 adapted to receive the rear end of the member 26. The rear socket member 29 as shown in section in Figure 6 is provided with an opening to receive a pin 31 adapted to register with a corresponding opening in the tubular member 26. The forward ends of the beams 26 are bifurcated to receive therebetween the rearwardly bent arms of a clevis 32. Each beam 26 is connected to the clevis by a pivot pin 33 providing a transverse axis for vertical swinging movement of the hitch structure. Clevis 32 forms a part of the hitch structure and extends transversely between the ends thereof. Forwardly extending lips 34 are provided on the clevis for connection to the draw-bar 35 of the tractor by means of a pivot pin 36. Draw-bar 35 is U-shaped and is connected to depending axle housings 37 of the tractor by bolts 38. The connection of the clevis 32 to the draw-bar 35 provides a vertical pivot to accommodate lateral swinging of the hitch structure 25 and therefore of the implement of which the hitch structure forms a part.

The grain drill of the present invention is provided with conventional seed dispensing mechanism by which material is deposited in the furrows formed by the opening disks. The seed dispensing mechanism is driven from the tractor by mechanism which includes a telescoping drive shaft 39 which comprises a sleeve member 40 and a shaft member 41. Shaft member 41 is connected by a universal joint 42 to a coupling member 43 affixed to a stub axle 44 of the tractor by means of a removable pin 45 passed through the coupling 43 and the axle 44. Stub axle 44 receives its power from the operation of the tractor wheels. Sleeve member 40 of the telescoping shaft 39 is connected by a universal joint 46 to a shaft 47 journaled upon a U-shaped bracket 48 secured to the right-hand beam 26 of the hitch structure 25.

Shaft 47 has mounted thereupon a sprocket wheel 49 which is connected by a chain 50 with a sprocket wheel 51 mounted upon a shaft 52 journaled on a bracket 53 affixed to transverse frame bar 17 of the grain drill. Shaft 52 is provided with an additional sprocket wheel 54 which is connected by a chain 55 and suitable gearing to drive the seed and fertilizer shafts, not shown, of the grain drill. It will thus be clear that drive is transmitted from the tractor to drive the dispensing mechanism of the implement through the stub axle 44 of the tractor, telescoping shaft 39, sprocket 49, and the chains 50 and 55. It will likewise be noted that the telescoping shaft 39 extends transversely of the tractor substantially in line with the axis of the tractor rear wheels and near the points of pivotal connection of the hitch structure 25 to the tractor, so that upon swinging of the implement horizontally or vertically about its pivots upon the tractor, drive may be transmitted from the tractor to the grain drill during such pivoting.

The grain drill is lifted upon the tractor for transport by means of lifting structure including a pair of laterally spaced rods 56 connected to the transverse frame bar 17. The upper end of each of the rods 56 is slidably received in a swivel member 57 pivotally mounted at the end of a lift arm 58. Each of the lift arms 58 extends rearwardly from the tractor and is secured at its forward end upon a rock-shaft 59, the ends of which are rotatably mounted in bearings 60 secured to fenders 61 of the tractor at opposite sides of the operator's station 14. A lever 62 is likewise fastened to the left-hand end of the rock-shaft 59 and is pivotally connected at its upper end by a connecting rod 63 with a rock-arm 64 mounted upon a rock-shaft 65 carried by the tractor body. Rock-shaft 65 is rocked by power derived from the tractor power plant and preferably through the intermediary of a hydraulic cylinder and piston unit indicated at 66. The upper end of each of the rods 56 is provided with an adjustable collar 67 which abuts the swivel 57 upon rocking the arm 64 to lift the grain drill and to accommodate a certain amount of floating movement of the implement in operating position.

Upon lifting the grain drill to transport position, it is not desirable that the seed and fertilizer distributing mechanisms continue to operate. A throw-out clutch is therefore provided and is shown in Figure 4. This throw-out clutch comprises a toothed member 68 splined to the shaft 47 and engageable with a toothed hub portion 69 of the sprocket wheel 49. Toothed member 68 is provided with a radially projecting shoulder portion 70, and mounted upon the member 68 on opposite sides of the shoulder portion 70 are collars 71 and 72. Collar 71 has laterally bent portions 73 receivable in recesses in the collar 72. A projection 74 extends radially outwardly from a cam member 75 having teeth 76 therein engageable with teeth 77 of a stationary camming member 78. Rotation of the camming member 75 causes toothed clutch member 68 to move laterally away from the toothed portion 69 of the sprocket wheel 49. Ears 79 on collar 71 are apertured to slidably receive a bolt 79a anchored to bracket 48 and to lugs formed on camming member 78. A spring 79b surrounds each bolt 79a and bears against ears 79 urging the camming members 75 and 78 into engagement. Rotation of the camming member 75 is accomplished by mechanism including a link 80 connected with the projection 74 and with a rock-arm 81 secured to the right-hand end of the rock-shaft 66. Upon movement of the arm 81, therefore, motion is transmitted through the link 80 to rock the movable camming member 75 and disengage the clutch parts 68 and 69, thus interrupting the drive between the tractor and the moving parts of the grain drill. Since the arm 81 is affixed to the same rock-shaft as the rock-arm 64, whenever the rock-shaft 65 is actuated to raise the grain drill to transport position upon the tractor, the arm 81 likewise is rocked in the same direction, and the link 80 by virtue of its connection to the throw-out clutch disengages the drive.

The hitch structure of the present invention is very readily connected to and disconnected from the traitor and facilitates the attachment and detachment of the entire implement. The implement may be disconnected by simply removing the pin 36 by which the clevis 32 is connected to the draw-bar of the tractor, then disconnecting the rods 56 and separating the telescoping parts 39, or by disconnecting the shaft 41 from the stub axle 44. This is accomplished by removing pin 45 which connects the coupling 43 with the stub axle. It will be noted in Figure 2 that the pin 45 is partially covered by a collar member 82 slidable axially thereupon. Collar 82 is provided with a reduced portion 83 to which is secured one end of a coil spring 84, the other end of which abuts against a collar 85 secured to the shaft 41 beyond the universal joint 42. The spring 84 thus bridges the universal joint 42 for a purpose which will hereafter become clear. The collar 82 is notched at 86 and engages a projection 87 on the coupling 43. Collar 82 is held against the projection 87 by the action of the coil spring 84. The notch 86 in the collar functions as a cam in engagement with the projection 87 of the coupling, and upon rotation of the collar the projection 87 will ride upon the outer rim thereof and the collar will back away from the pin 45 to accommodate its withdrawal.

The operator of the tractor then is able to drive away from the implement. As frequently happens, the operator in disconnecting the implement from the tractor fails to or does not wish to disconnect the portion 41 of the telescoping shaft from the stub axle, in which case he will drive off leaving the shaft portion 41 extending outwardly laterally from the stub axle. As long as the tractor is in operation and the wheels are moving, of course, the shaft 41 will continue to revolve. In such case, if, in the absence of the spring 84 shaft 41 should buckle with respect to stub shaft 44 and hang downward, considerable damage would be done to the tractor and to the shaft 41. However, the spring 84 extending to opposite sides of the universal joint 42 serves to prevent the shaft 41 from pivoting and holds it in a substantially horizontal position.

The telescoping shaft 39 and the universal joints 42 and 46 permit operation of the grain drill seed and fertilizer drive mechanism during pivoting of the implement about its connection to the tractor. The lateral swinging of the implement, however, is preferably limited, and this is accomplished by the provision of bolts 88 threaded for reception in threaded openings in the clevis 32 at opposite sides of the vertical pivot pin 36. The heads of these bolts are adapted to engage the draw-bar 35 upon the lateral swinging of the implement, and adjustment may be made therein by manipulating nuts 89.

It is believed that the operation of the grain drill and of the hitch structure of the present invention will be clearly understood from the foregoing description. Modifications may be made, however, in the arrangement and number of parts without departing from the spirit of the invention or the scope of the appended claims.

What is claimed is:

1. The combination with a tractor having a transverse rear axle and rear drive wheels, of an implement such as a grain drill or the like, having a driven part, comprising a transverse frame, supporting wheels on the frame, power lift means on the tractor including a rock-shaft, a rock-arm at each end of the shaft, connecting means between one said rock-arm and said frame structure to raise the implement to transport position, a hitch point on the tractor, a draft structure mounted upon the frame and connected to the tractor at said hitch point upon vertical and horizontal pivots for lateral and vertical swinging with respect thereto, drive transmission means carried by the draft structure at a location adjacent said pivots, said transmission means including a clutch comprising a driving element, a driven element and disengaging means therefor, means transmitting drive from the driven element to the implement driven part, means for driving the driving element from the tractor, and connecting means between the other said rock-arm and the clutch disengaging means for actuating the latter upon operation of the said power lift means.

2. The combination with a tractor having a transverse rear axle and rear drive wheels, of an implement such as a grain drill or the like, having a driven part, comprising a transverse frame, supporting wheels on the frame, power lift means on the tractor including a rock-shaft, a rock-arm at each end of the shaft, connecting means between one said rock-arm and said frame structure to raise the implement to transport position, a hitch point on the tractor, a draft structure mounted upon the frame and connected to the tractor at said hitch point upon vertical and horizontal pivots for lateral and vertical swinging with respect thereto, drive transmission means carried by the draft structure at a location adjacent said pivots, said transmission means including a clutch comprising a driving element, a driven element and disengaging means therefor, means transmitting drive from the driven element to the implement driven part, means for driving the driving element from the tractor, and link means pivotally connecting the other said rock-arm and the clutch disengaging means and operable in any operating position of the implement to actuate the clutch disengaging means upon operation of the said power lift means.

CLARENCE C. HAAS.

REFERENCES CITED

The following references are of record in the file of this patent:

UNITED STATES PATENTS

| Number | Name | Date |
| --- | --- | --- |
| 1,405,001 | Reichelt | Jan. 31, 1922 |
| 1,864,122 | Cole | June 21, 1932 |
| 2,209,029 | Kriegbaum et al. | July 23, 1940 |
| 2,351,078 | Silver | June 13, 1944 |